(12) United States Patent
Mudra et al.

(10) Patent No.: US 12,067,665 B2
(45) Date of Patent: Aug. 20, 2024

(54) SYSTEMS AND METHODS FOR CREATING DIGITAL ANIMATIONS

(71) Applicant: Canva Pty Ltd, Surry Hills (AU)

(72) Inventors: Stephen Richard Mudra, Perth (AU); Liam Brodie Rayner, Warragul (AU); Mathew James Paul Manning, Thornbury (AU); Melanie Joy Perkins, Surry Hills (AU); Jane Maree Abernethy, Erskineville (AU); Elijah Alexander Sheppard, South Coogee (AU); Joan Dyquiangco Magno, Waterloo (AU); Jessica Faccin, Rockdale (AU)

(73) Assignee: Canva Pty Ltd, Surry Hills (AU)

( * ) Notice: Subject to any disclaimer, the term of this patent is extended or adjusted under 35 U.S.C. 154(b) by 0 days.

(21) Appl. No.: 18/211,211

(22) Filed: Jun. 16, 2023

(65) Prior Publication Data

US 2023/0410401 A1    Dec. 21, 2023

(30) Foreign Application Priority Data

Jun. 21, 2022    (AU) .............................. 2022204345

(51) Int. Cl.
*G06T 11/20*    (2006.01)
*G06F 3/048*    (2013.01)
(Continued)

(52) U.S. Cl.
CPC ............ *G06T 13/80* (2013.01); *G06T 11/203* (2013.01)

(58) Field of Classification Search
CPC ......... G06T 11/203; G06T 13/80; G06T 7/20; G06T 11/20; G06T 11/80; G06T 2213/00; G06T 2200/00; G06T 2200/24; G06T 2201/00; G06T 7/543; G06T 7/579; G06T 7/60; G06T 9/008; G06T 13/00; G06T 2219/2004; G06T 11/60; G06T 19/20; G06T 2219/2012; G06F 3/048; G06F 3/0482; G06F 3/04845; G06F 3/04847; G09G 5/30; G09G 5/32; G09G 5/38;
(Continued)

(56) References Cited

U.S. PATENT DOCUMENTS 11,775,159 B1 * 10/2023 Yavercovski .......... G06N 20/00
715/848
2010/0134499 A1    6/2010 Wang et al.
(Continued)

OTHER PUBLICATIONS

First Examination Report for Australian Patent Application No. 2022204345 mailed Sep. 15, 2022.

*Primary Examiner* — Wesner Sajous
(74) *Attorney, Agent, or Firm* — GrowIP Law Group LLC

(57) ABSTRACT

Described herein is a computer implemented method including: displaying a design including a first design element; detecting an initiate record animation event; receiving animation definition input creating an original path between an initial position and a final position, the animation definition input drawing the original path at original traversal speeds; generating animation data based on the animation definition input, the animation data including data that allows both the original path and the original traversal speeds to be reproduced; and associating the animation data with the first design element.

20 Claims, 7 Drawing Sheets

(51) Int. Cl.
*G06N 20/00* (2019.01)
*G06T 7/20* (2017.01)
*G06T 13/00* (2011.01)
*G06T 13/80* (2011.01)

(58) Field of Classification Search
CPC .............. G09G 5/391; G09G 2320/00; G09G 2340/04; H04N 5/144–147; H04N 19/139; G06N 20/00
See application file for complete search history.

(56) References Cited

U.S. PATENT DOCUMENTS

| | | |
|---|---|---|
| 2010/0188409 A1 | 7/2010 | Ooba |
| 2012/0105464 A1* | 5/2012 | Franceus ................. G06T 13/20 345/581 |
| 2018/0068608 A1* | 3/2018 | Seder ........................ G06T 5/50 |
| 2020/0302671 A1 | 9/2020 | Poling et al. |
| 2022/0122269 A1* | 4/2022 | Marty ....................... G06T 7/20 |

\* cited by examiner

SYSTEMS AND METHODS FOR CREATING DIGITAL ANIMATIONS

CROSS-REFERENCE TO RELATED APPLICATION

This application is a U.S. Non-Provisional Application that claims priority to Australian Patent Application No. 2022204345, filed Jun. 21, 2022, which is hereby incorporated by reference in its entirety.

TECHNICAL FIELD

Aspects of the present disclosure are directed to systems and methods for creating digital animations.

BACKGROUND

Computer applications for creating and publishing graphic designs exist. Generally speaking, such applications allow users to create a design by, for example, creating a page and adding design elements to that page.

Once a design element has been added to a page, some applications provide mechanisms by which a user can animate an element.

Background information described in this specification is background information known to the inventors. Reference to this information as background information is not an acknowledgment or suggestion that this background information is prior art or is common general knowledge to a person of ordinary skill in the art.

SUMMARY

Described herein is a computer implemented method including: displaying a design including a first design element; detecting an initiate record animation event; receiving animation definition input creating an original path between an initial position and a final position, the animation definition input drawing the original path at original traversal speeds; generating animation data based on the animation definition input, the animation data including data that allows both the original path and the original traversal speeds to be reproduced; and associating the animation data with the first design element.

Also described herein is a computer implemented method including: displaying a design including a first design element; detecting an initiate record animation event; receiving animation definition input that uses the first design element to draw an original path between an initial position and a final position; generating animation data based on the animation definition input, the animation data including data that allows the original path to be reproduced; and associating the animation data with the first design element.

Figure 1:
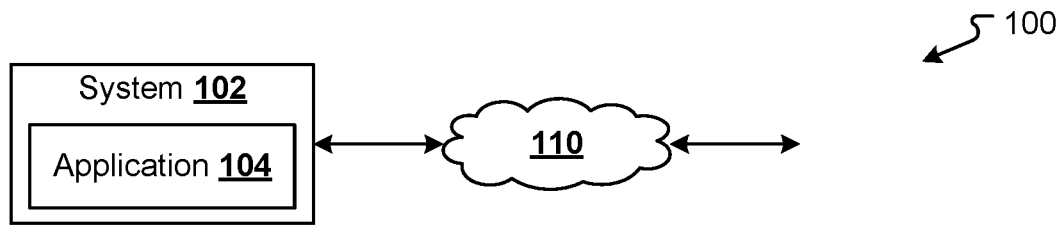
FIG. 1 depicts a computer processing system that is configured to perform the various functions described herein.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

The present disclosure is directed to systems and methods for creating digital animations.

The techniques disclosed herein are described in the context of a computer system that is configured to facilitate the creation of graphic designs. By way of example, and generally speaking, the computer system may provide user interfaces that allow a user to create and edit a design by adding elements (such as graphics and text) to a design page and editing those elements.

The present disclosure provides techniques that allow a user to create object design element animations. Generally speaking, this involves recording a particular behaviour for an element (or a group of elements) that can then be replayed. As an example, a user may define an animation in which a particular element moves along a defined path from an initial position to a final position. When that animation is triggered, the element will automatically (without user input) be displayed as moving along that defined path.

FIG. 1 depicts a computer processing system 102 that is configured to perform the various functions described herein. Computer processing system 102 may be any suitable type of computer processing system, for example a desktop computer, a laptop computer, a tablet device, a smart phone device, or an alternative computer processing system.

In this example, computer system 102 is configured to perform the functions described herein by execution of a software application 104—that is, instructions that are stored in a storage device (such as non-transitory memory 210 described below) that is accessible to the computer system 102 and that are executed by a processing unit of the system 102 (such as processing unit 202 described below).

Application 104 may take various forms, For example, application 104 be a native/stand-alone graphic design application (or a component of such an application), a web browser application (such as Chrome, Internet Explorer, Safari or an alternative web browser application), an add-on or plug-in application (that operates in conjunction with another application).

Further, while application 104 is depicted as running on a single computer processing system 102, it may be a distributed application in which the functionality is performed by multiple inter-operating applications that may execute on the same or different computer processing systems. As one example, application 104 may be a client application that communicates (via network 110) with a server application (not shown), and the functionality described herein is jointly performed by the client and server applications.

In the example of FIG. 1, system 102 is connected to a communications network 110. Via network 110 system 102 can communicate with (e.g. send data to and receive data from) other computer processing systems (not shown). The techniques described herein can, however, be implemented on a stand-alone computer system that does not require network connectivity or communication with other systems.

In FIG. 1, system 102 is depicted as having/executing a single application 104. However, system 102 may (and typically will) include additional applications (not shown). For example, and assuming application 104 is not part of an operating system application, system 102 will include separate operating system application (or group of applications).

Figure 2:
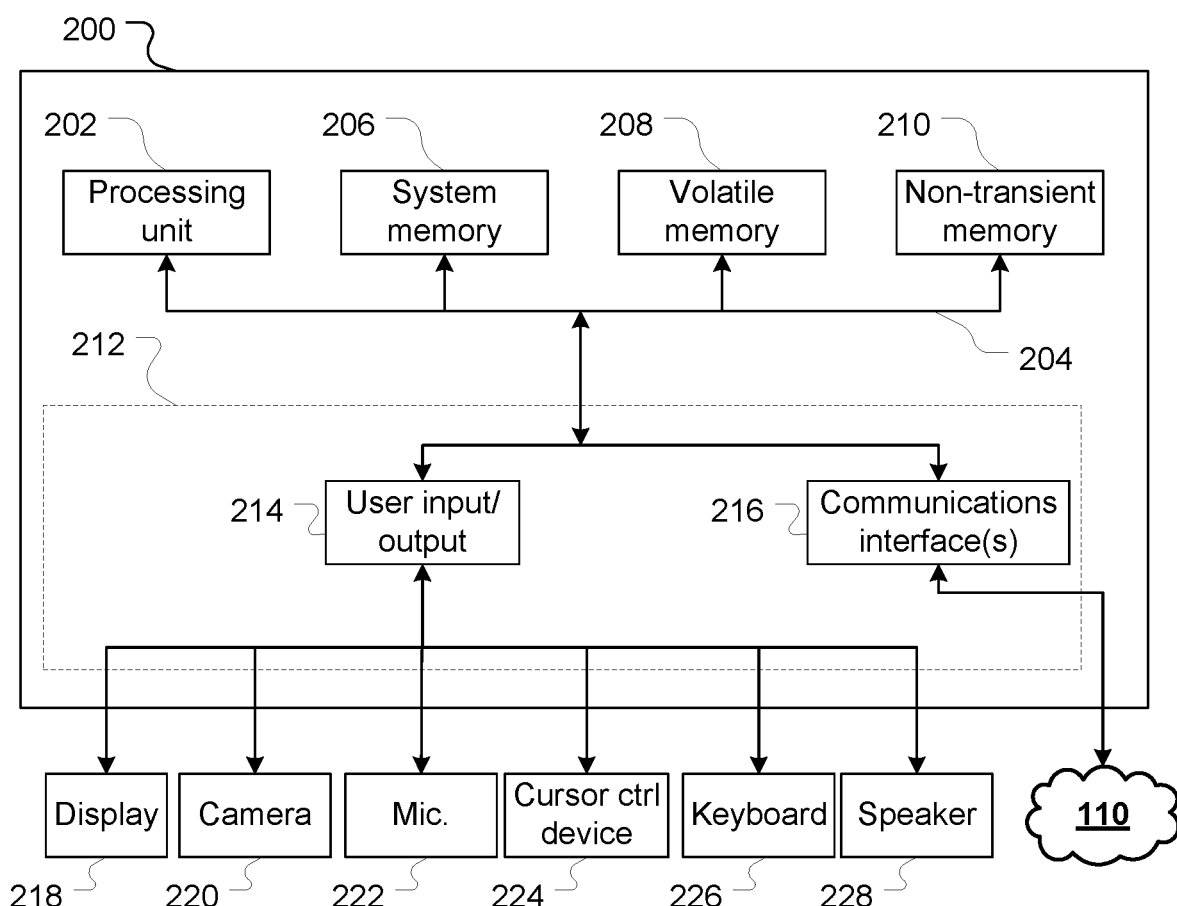
FIG. 2 is a block diagram depicting hardware components of a computer processing system.

Turning to FIG. 2, a block diagram depicting hardware components of a computer processing system 200 is provided. The computer processing system 100 of FIG. 1 may be a computer processing system such as 200 (though alternative hardware architectures are possible).

Computer processing system 200 includes at least one processing unit 202. The processing unit 202 may be a single computer processing device (e.g. a central processing unit, graphics processing unit, or other computational device), or may include a plurality of computer processing devices. In some instances, where a computer processing system 200 is described as performing an operation or function all processing required to perform that operation or function will be performed by processing unit 202. In other instances, processing required to perform that operation or function may also be performed by remote processing devices accessible to and useable by (either in a shared or dedicated manner) system 200.

Through a communications bus 204 the processing unit 202 is in data communication with a one or more machine readable storage devices (also referred to as memory devices). Computer readable instructions and/or data which are executed by the processing unit 202 to control operation of the processing system 200 are stored on one more such storage devices. In this example system 200 includes a system memory 206 (e.g. a BIOS), volatile memory 208 (e.g. random access memory such as one or more DRAM modules), and non-transitory memory 210 (e.g. one or more hard disk or solid state drives).

System 200 also includes one or more interfaces, indicated generally by 212, via which system 200 interfaces with various devices and/or networks. Generally speaking, other devices may be integral with system 200, or may be separate. Where a device is separate from system 200, connection between the device and system 200 may be via wired or wireless hardware and communication protocols, and may be a direct or an indirect (e.g. networked) connection.

Wired connection with other devices/networks may be by any appropriate standard or proprietary hardware and connectivity protocols. For example, system 200 may be configured for wired connection with other devices/communications networks by one or more of: USB; eSATA; Ethernet; HDMI; and/or other wired connections.

Wireless connection with other devices/networks may similarly be by any appropriate standard or proprietary hardware and communications protocols. For example, system 200 may be configured for wireless connection with other devices/communications networks using one or more of: BlueTooth; WiFi; near field communications (NFC); Global System for Mobile Communications (GSM), and/or other wireless connections.

Generally speaking, and depending on the particular system in question, devices to which system 200 connects—whether by wired or wireless means—include one or more input devices to allow data to be input into/received by system 200 and one or more output device to allow data to be output by system 200. Example devices are described below, however it will be appreciated that not all computer processing systems will include all mentioned devices, and that additional and alternative devices to those mentioned may well be used.

For example, system 200 may include or connect to one or more input devices by which information/data is input into (received by) system 200. Such input devices may include keyboard, mouse (or other cursor control device), trackpad, microphone, accelerometer, proximity sensor, GPS, and/or other input devices. System 200 may also include or connect to one or more output devices controlled by system 200 to output information. Such output devices may include devices such as a display (e.g. a LCD, LED, touch screen, or other display device), speaker, vibration module, LEDs/other lights, and/or other output devices. System 200 may also include or connect to devices which may act as both input and output devices, for example memory devices (hard drives, solid state drives, disk drives, and/or other memory devices) which system 200 can read data from and/or write data to, and touch screen displays which can both display (output) data and receive touch signals (input).

By way of example, where system 200 is a personal computing device such as a desktop or laptop device, it may include a display 218 (which may be a touch screen display), a camera device 220, a microphone device 222 (which may be integrated with the camera device), a cursor control device 224 (e.g. a mouse, trackpad, or other cursor control device), a keyboard 226, and a speaker device 228.

As another example, where system 200 is a portable personal computing device such as a smart phone or tablet it may include a touchscreen display 218, a camera a camera device 220, a microphone device 222, and a speaker device 228.

As another example, where system 200 is a server computing device it may be remotely operable from another computing device via a communication network. Such a server may not itself need/require further peripherals such as a display, keyboard, cursor control device etc. (though may nonetheless be connectable to such devices via appropriate ports).

Alternative types of computer processing systems, with additional/alternative input and output devices, are possible.

System 200 also includes one or more communications interfaces 216 for communication with a network, such as network 110 of FIG. 1. Via the communications interface(s) 216, system 200 can communicate data to and receive data from networked systems and/or devices.

System 200 may be any suitable computer processing system, for example, a server computer system, a desktop computer, a laptop computer, a tablet computing device, a smart phone, a personal digital assistant, or an alternative computer processing system.

System 200 stores or has access to computer applications (also referred to as software or programs)—i.e. computer readable instructions and data which, when executed by the processing unit 202, configure system 200 to receive, process, and output data. Instructions and data can be stored on non-transitory machine readable medium such as 210 accessible to system 200. Instructions and data may be transmitted to/received by system 200 via a data signal in a transmission channel enabled (for example) by a wired or wireless network connection over an interface such as communications interface 216.

Typically, one application accessible to system 200 will be an operating system application. In addition, system 200 will store or have access to applications which, when executed by the processing unit 202, configure system 200 to perform various computer-implemented processing operations described herein. For example, in FIG. 1 computer processing system 100 (which may be or include the hardware components of computer processing system 200) includes and executes application 104.

In some cases part or all of a given computer-implemented method will be performed by system 200 itself, while in other cases processing may be performed by other devices in data communication with system 200.

It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Figure 3:
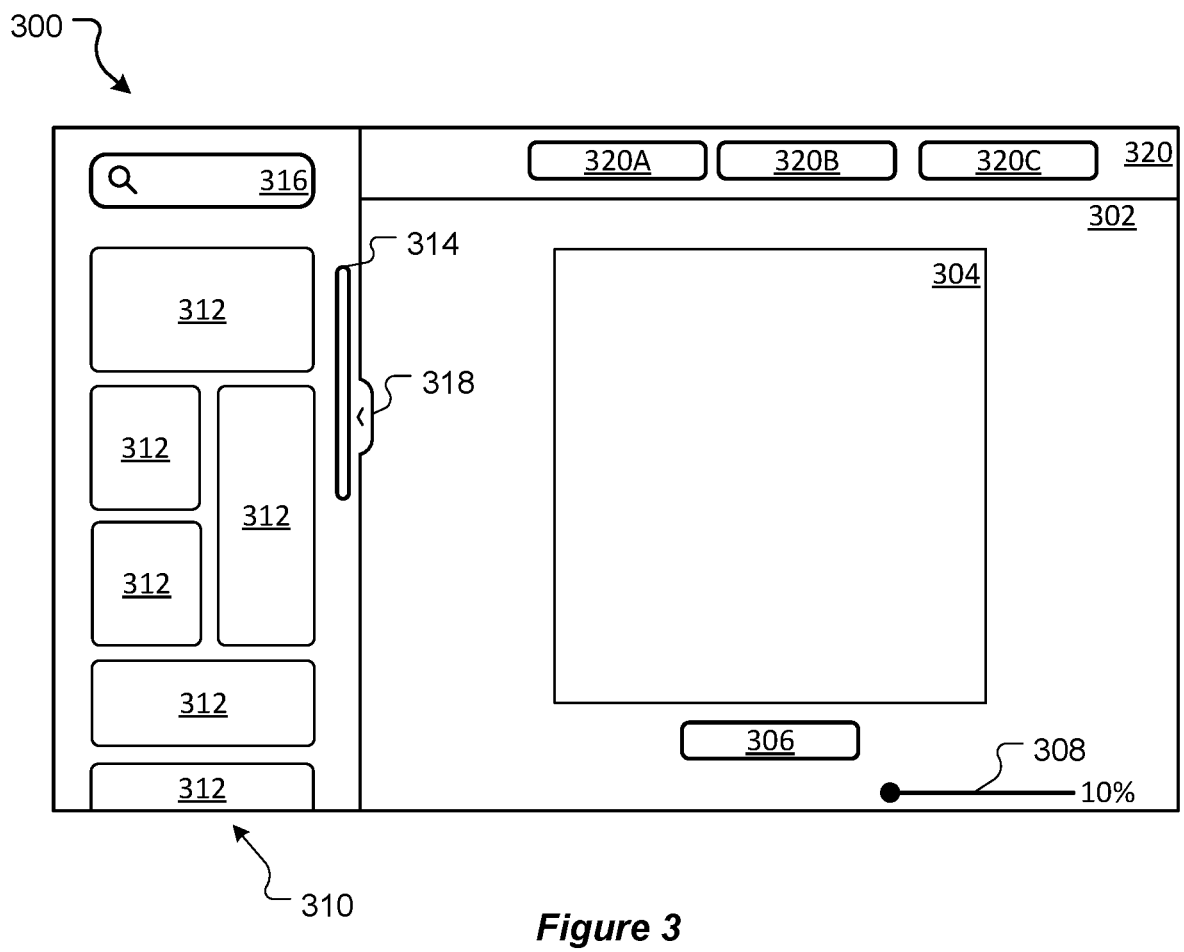
FIG. 3 depicts an example design creation graphical user interface.

In the present disclosure, application 104 configures the system 102 to provide a design creation graphical user interface (GUI). Generally speaking, a design creation GUI will allow a user to create, edit, and output designs. To illustrate the types of features that application 104 may provide, FIG. 3 provides one example of a design creation GUI 300. Alternative interfaces, with alternative layouts and/or that provide alternative tools and functions, are possible.

GUI 300 includes a design preview area 302 on which a canvas 304 is shown. Canvas 304 is used to display a page (or, in some cases multiple pages) of a design that is being created or edited. In this example an add page control 306 is provided (which, if activated by a user, causes a new page to be added to the design being created) and a zoom control 308 (which a user can interact with to zoom into/out of page currently displayed by canvas 304).

GUI 300 also includes an asset preview area 310. Asset preview area 310 displays previews 312 of assets that are available to users to assist in creating designs.

Different types of assets may be made available, for example design elements (of varying types—e.g. raster images, vector graphics, shapes, videos, audio clips, and/or other design element), design templates, design styles (e.g. defined sets of colours, font types, and/or other assets/asset parameters), and/or other assets that a user may use when creating their design. For example, a preview 312 may be of a design element (e.g. a raster graphic, a vector graphic, a video, an audio track, or an alternative element) and a user may add that design element to the design being created by dragging and dropping the preview 312 onto the canvas 304. Design elements may be added to a design in other ways. In this example, the preview area 310 displays a scroll control 314 allowing a user to scroll through previews 312. Scroll control 314 may be hidden when user focus is not in the preview area 310.

Asset preview area 310 also includes a search control 316 via which a user can submit search data (e.g. a string of characters) to search for particular design assets. Previews 312 of the search results returned are then displayed in the asset preview area 310. In this example, a hide preview area control 318 is provided which can be activated to hide the asset preview area 310 (serving to enlarge the design preview area 302).

Depending on implementation, the previews 312 displayed in asset preview area 310 (and the design assets corresponding to those previews) may be accessed from various locations. For example, the search functionality invoked by search control 316 may cause application 104 to search for assets that are stored in locally accessible memory of the system 100 on which application 102 executes (e.g. non-transitory memory such as 210 or other locally accessible memory), assets that are stored at a remote server (and accessed via a server application running thereon), and/or assets stored on other locally or remotely accessible devices.

GUI 300 also includes an additional controls area 320 which, in this example, is used to display additional controls 322. The additional controls 320 may include permanent controls (e.g. controls such as save, download, print, share, publish, and/or other controls that are frequently used/widely applicable and that application 104 is configured to permanently display); user configurable controls (which a user can select to add to or remove from area 320), and/or adaptive controls (which may automatically change depending, for example, on the type of design element that is currently selected/being interacted with by a user). For example, if a text element is selected, adaptive controls such as font style, type, size, position/justification, and/or other font related controls may be displayed. Alternatively, if a vector graphic element is selected, adaptive controls such as fill attributes, line attributes, transparency, and/or other vector graphic related controls may be displayed.

In the present example, GUI 300 includes a record animation control 320A which, when activated, triggers an animation recordal process as described below.

Once a design has been created, application 104 may provide various options for outputting that design. For example, application 104 may provide a user with options to output a design by one or more of: saving the design to local memory of client system 130 (e.g. non-transitory memory 210); saving the design to data store 118 of server environment 110; printing the design to a printer (local or networked); communicating the design to another user (e.g. by email, instant message, or other electronic communication channel); publishing the design to a social media platform or other service (e.g. by sending the design to a third party server system with appropriate API commands to publish the design); and/or by other output means.

In order to output a design, application 104 is be configured to format the design to an appropriate file type. For example, in the present disclosure a design may include an animation. In order to output such a design application 104 may convert the design from a native format (e.g. a design format used by application 104 itself) to an alternative format, for example to a video format (such as MPEG4, MOV, AVI, or an alternative video format), an animation format (e.g. an animated GIF format), or an alternative format that is appropriate for animations.

Data in respect of designs that have been (or are being) created via application 104 may be stored in various formats.

An example design data format will now be described. Alternative design data formats (storing alternative design attributes) are, however, possible, and the processing described herein can be adapted for alternative formats.

In the present context, data in respect of a given design is stored in a design record. Generally speaking, a design record defines certain design-level attributes and includes page data. The page data includes (or references) one or more page records, each of which defines a page of the design. In turn, each page record may define one or more page—level attributes as well as element data for the page. The element data for a given page defines (or references) one or more element records which define design elements that have been added to the page In the present example, the format of each design record is a device independent format comprising a set of key-value pairs (e.g. a map or dictionary). To assist with understanding, a partial example of a design record format is as follows:

| Key/field | Note | E.g. |
|---|---|---|
| Design ID | A unique identifier of the Design. | "designID": "abc123", |
| Dimensions | Dimensions (e.g. width and height) of the pages of the design. | "dimensions": {<br>　"width": 1080,<br>　"height": 1080<br>}, |
| Pages | An array of page records (described further below). | "pages": [<br>　{"elements": [{...}, {...},..., {...}]},<br>　{"elements": [{...}, {...},..., {...}]},<br>　...,<br>　{"elements": [{...}, {...},..., {...}]}<br>], |

In this example, the design-level attributes include a design identifier and default page dimensions. Additional and/or alternative design-level attributes may be provided, such as attributes regarding creation date, design version, design creator, design permissions, and/or other design-level attributes.

A design record's page data is a set (in this example an array) of page records, each of which defines page data in respect of a page of the design. In this example, a page record's position in a design's page array serves to identify the page and also determines its position in the design (e.g. a page at array index n appears after a page at array index n−1 and before a page at array index n+1). Page order may be alternatively handled, however, for example, by storing page order as an explicit attribute.

In this example, each page record includes element data in the form of an element set (in this example an array). While not shown, a page record may also include additional page-level data, for example page dimensions (which, if present, override the design-level dimensions).

Each element in a page's element array is either an element record (defining an element or a group of elements that has been added to the page in question). In this example, an element record's position in an element array serves to identify that element and determines its depth on the page (e.g. an element at array index n is positioned above an element at array index n−1 and below an element at array index n+1). Element depth may be alternatively handled, however, for example, by storing depth as an explicit element attribute.

Generally speaking, an element is an object that has been added to a page—e.g. by copying and pasting, importing from one or more element libraries (e.g. libraries of images, animations, videos, etc.), drawing/creating using one or more design tools (e.g. a text tool, a line tool, a rectangle tool, an ellipse tool, a curve tool, a freehand tool, and/or other design tools), or otherwise being added to a design page. As described above, application 104 may provide a drag-and-drop interface for adding design elements to a design—e.g. by dragging a preview 314 of a particular element and dropping it onto the canvas 304 (which is associated with and provides a preview of a particular page of the design).

The types of design elements available will depend on the system in question. By way of example, however, design element types such as the following may be provided: image elements (e.g. raster and/or vector graphic elements); video elements; audio elements; text elements; frame elements (e.g. vector graphic elements configured to receive other elements—such as graphics or videos); effects (e.g. an effect that applies to a page, such as a shower of confetti or other effect); and/or elements of other types.

The particular data (or attributes) associated with a design element that has been added to a page will depend on the type of element. For example, video type elements and audio type elements may include attributes such as start/end trim times which are not relevant to image-type elements.

By way of example, an element record for an image type element may be as follows:

| Key/field | Note | E.g. |
|---|---|---|
| Type | A value defining the type of the element (E.g. image, text, video, audio, other).<br>In the present example, an element record may define an element group - i.e. a set of two or more elements that have been grouped together. In this case, a type such as "GROUP" may be used to indicate the record defines an element group. | "type": "IMAGE", |

| Key/field | Note | E.g. |
|---|---|---|
| Position | Data defining the position of the element (or element group): e.g. an (x, y) coordinate pair defining (for example) the top left point of the element (or element group). | "position": (100, 100), |
| Size | Data defining the size of the element (or element group): e.g. a (width, height) pair. | "size": (500, 400), |
| Rotation | Data defining any rotation of the element (or element group). | "rotation": 0, |
| Opacity | Data defining any opacity of the element (or element group). | "opacity": 1, |
| Media identifier | Data defining a link or pointer to a location where the original element data - e.g. the original raster or vector image data in this example - is located. If the element record defines a group this attribute may be null/omitted. | "mediaReference": "abc123", |
| Children | If the element record defines a group of elements, this attribute provides data defining the elements that are members of the group. In this example, children are defined by a further array of element records (each element record in the children array defining an element (or element group) that is a member of the group. | "children": [{...}, {...},..., {...}], |
| Animation | An object describing any animation associated with the element (or element group). This is described further below. | "animation": {...}, |

The storage location for design data (e.g. design records) will depend on implementation. For example, if application 104 operates as a stand-alone application design records will typically be stored on and retrieved from locally accessible memory (e.g. non-transitory memory 210). Alternatively, if application 104 is a client application that operates in conjunction with a server system, design records may (ultimately) be stored on/retrieved from data storage accessible to the server system. This would involve the client application 104 communicating design data to a server application executing at the server system which stores the data in server data storage.

In the present disclosure, processing is performed with respect to individual design pages. To this end, and unless stated otherwise, reference to a design herein is reference to a single page of a design.

As noted, the present disclosure is generally concerned with creating animations. In the present embodiments, an animation for a particular design element is defined by animation data that is stored—or, more generally associated—with that design element. The generation of animation data is discussed further below.

Figure 4:
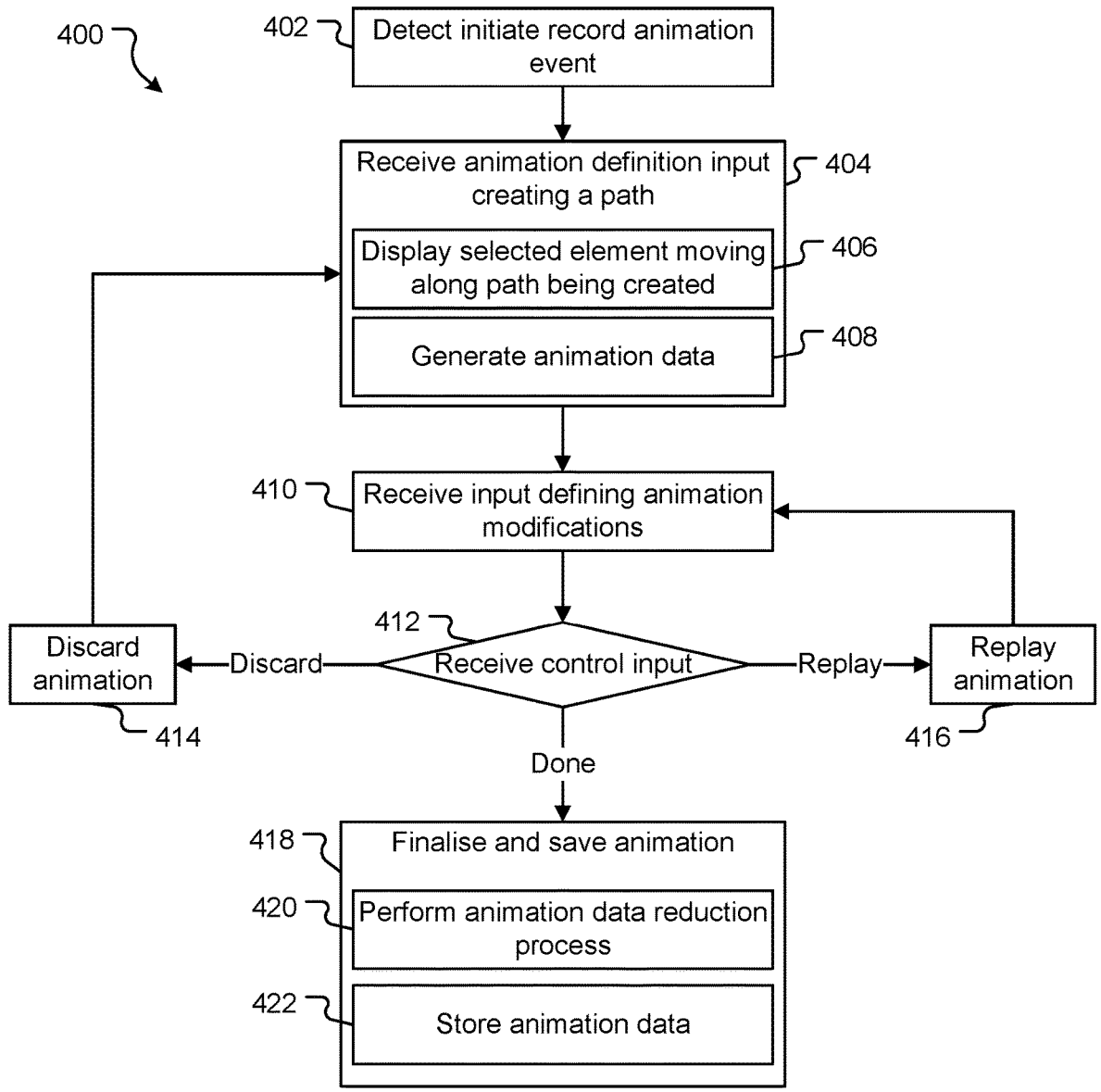
FIG. 4 depicts operations performed in an animation creation process.

Turning to FIG. 4, a computer implemented method 400 for creating a digital animation will be described. The operations of method 400 will be described as being performed by application 104 running on computer processing system 102. In alternative embodiments, however, the processing described may be performed by one or more alternative applications running on system 102 and/or other computer processing systems.

In the present embodiments, method 400 operates in a context where a design including a page with at least on design element has been created. The application 104 displays the design in a user interface, for example on a canvas 304 of a GUI 300 as described above. The user interface is displayed on a display device (such as display 218 described above).

Method 400 will be described with reference to FIG. 5 which provides example user interfaces 500 (or partial user interfaces) to assist in illustrating the operation of method 400. In this instance, user interfaces 500 are based on GUI 300 of FIG. 3 and include a canvas 304 which depicts a design page with a single design element 502. Alternative user interfaces are possible.

At 402, application 104 detects an initiate record animation event. In the present embodiments, user interaction with a record animation control (such as control 320A described above) is an initiate record animation event. Additional and/or alternative initiate record animation events are possible, for example user interaction with an alternative control (accessed via a menu system, a command search, or other means), a defined voice input command, or alternative events.

At 404, application 104 receives what will be referred to as an animation definition input that creates a path between an initial position on the canvas 304 and a final position on the canvas 304.

In the present embodiment, the animation definition input may be considered as including: a selection component that selects a particular design element 502 of the design that is displayed on the canvas 304 at the initial position; a draw component that creates a path from the initial position to a final position on the canvas 304; and an end recording component that releases or drops the selected design element 502 at the final position on the canvas 304 and thereby ends the animation definition input (and animation recording).

To illustrate, where the animation definition input is input via a cursor control device 224 (such as a mouse): the selection component may be pressing/holding a button of the device 224 while a cursor controlled by the device 224 is positioned on (or proximate) the design element; the draw component is the user moving the device 224 (while the button remains pressed); and the end recording component may be releasing the button of the device 224 while the cursor is at the desired position (which becomes the final position). Alternatively, if the animation definition input is input via a touch screen device (e.g. a touch screen display such as 218): the selection component may be contacting the touch screen at a position corresponding (or proximate) to the design element; the draw component is the user dragging the contact across the touch screen; and the end recording component may be releasing the contact at the desired position (which becomes the final position).

The design element that is selected to be animated may be any element of the design. Typically the design element will be a graphic element such as an image (raster or vector graphic). The selected element could, however, be an alternative type of element such as a video.

In certain implementations, the selected design element may be an element group (or a member of an element group), in which case application 104 may be configured to associate the animation with the entire group. Accordingly, reference to a selected design element (or a design element being associated with an animation) may equally refer to a selected design element group (or a design element group associated with an animation).

At 406, and in the present embodiment, while receiving the animation definition input (or, specifically, the draw component thereof that creates a path) application 104 displays the selected design element 502 moving along the path that the user is creating. This provides the user with the impression that they are effectively drawing the path using the selected design element (or design element group).

Figure 5:
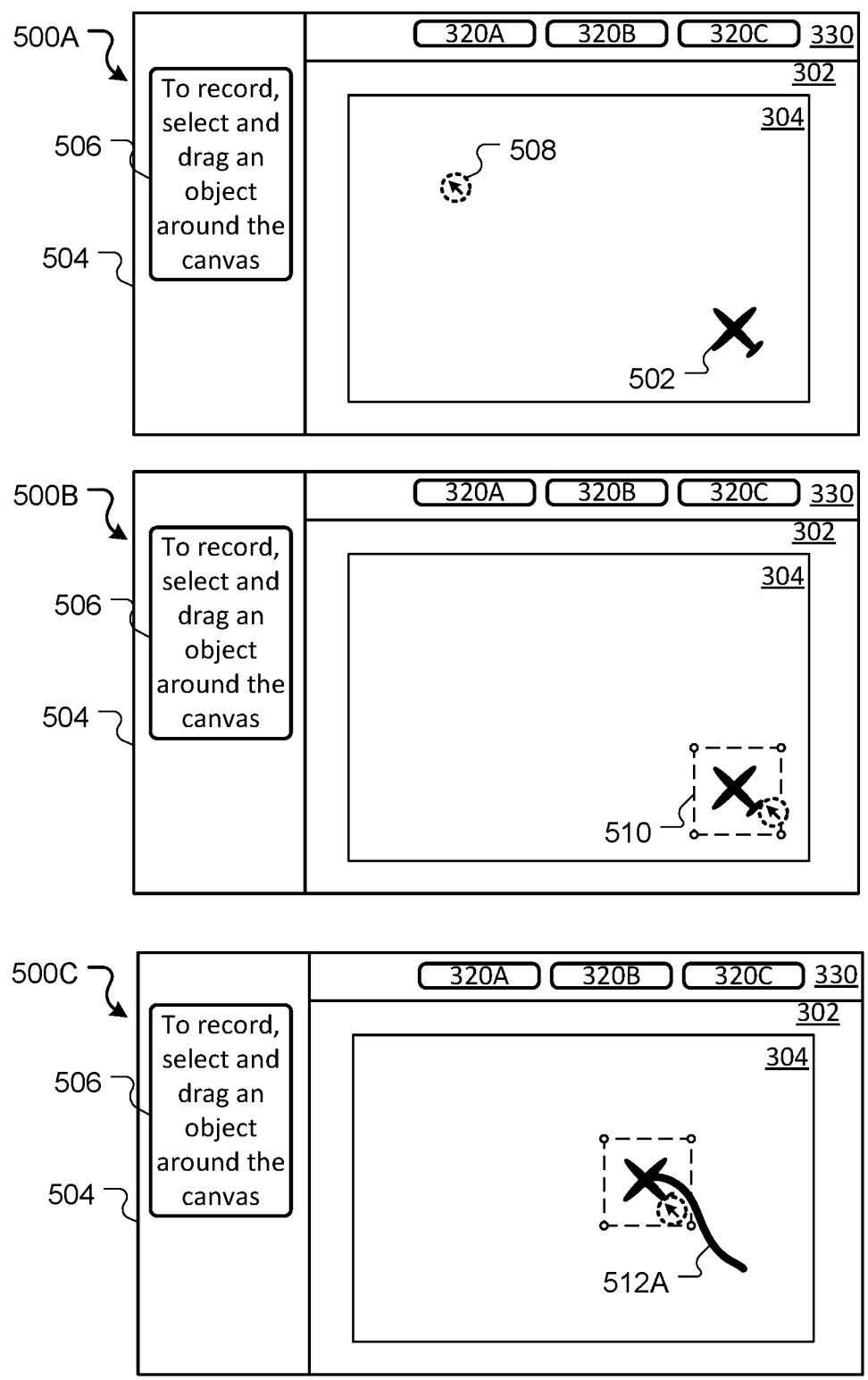
FIG. 5 depicts example user interfaces displayed while creating an animation.
Figure 5:
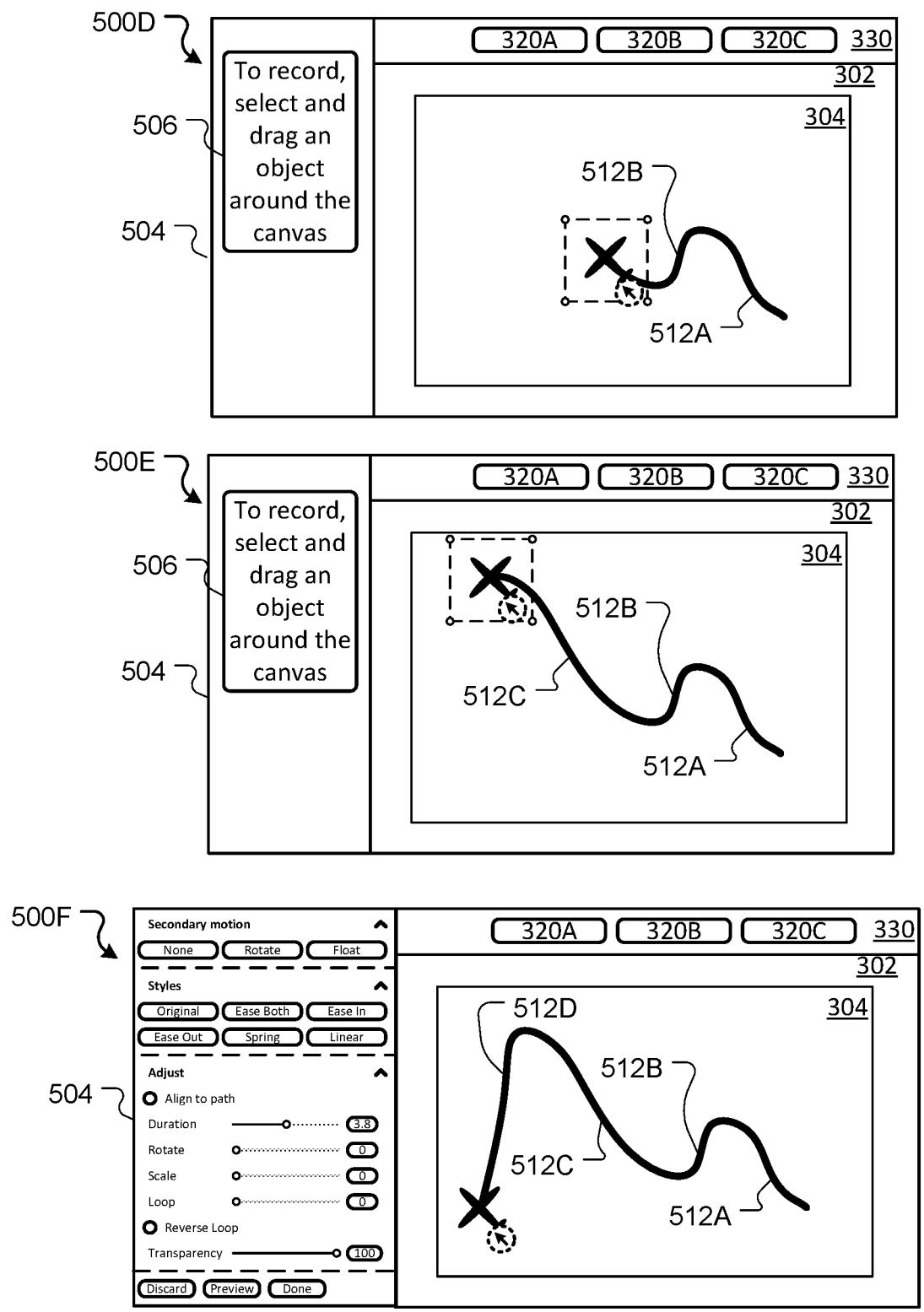
Figure 5:
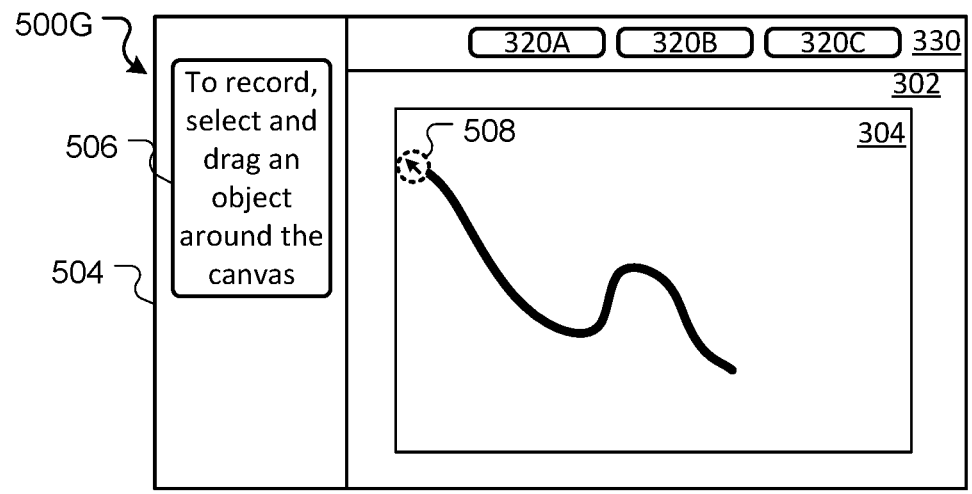
Figure 5:
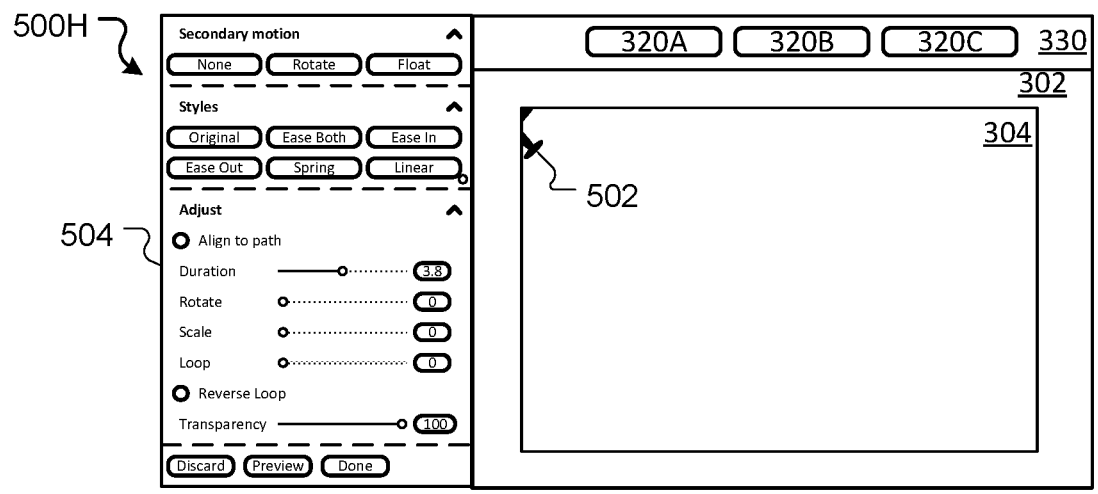

GUIs 500A-500F of FIG. 5 provide an examples of the animation definition input. GUIs 500A-500F include a representation of a cursor 508 as controlled by a cursor control device such as 224. Where GUI 500 is displayed on a touch-screen display 218, however, a cursor 508 may not be displayed.

In GUI 500A, the design element 502 is at its initial position on the canvas 304 and the initiate record animation even has been detected by application 104. In this particular example, in response to detecting the initiate record animation event application 104 has replaced the asset preview area 310 (as shown in FIG. 3) with an animation control area 504. At this stage the animation control area 504 simply includes a notification 506 indicating to the user that an animation can be recorded by dragging an object (i.e. a design element) around the canvas.

In GUI 500B, user input selecting design element 502 has been received (e.g. the selection component of the animation definition input). In this example, a bounding box 510 is displayed around the selected design element 502 to provide the user with visual feedback that the design element 502 has been selected. In other embodiments an alternative mechanism may be used to visually indicate the selected design element may be used (e.g. by changing its fill and/or outline colour or alternatively visually distinguishing the element). In still further embodiments, the selected design element is not visually distinguished (and no bounding box or other means for visually distinguishing the selected element is displayed).

GUIs 500C-500E depict user input dragging the selected design element 502 around the canvas 304, thereby creating a path 512 (e.g. the draw component of the animation definition input). Specifically: between GUI 500B and 500C the user input drags the selected design element 502 to create path portion 512A; between GUI 500C and 500D the user input drags the selected design element 502 to create path portion 512B; between GUI 500D and 500E the user input drags the selected design element 502 to create path portion 512C; and between GUI 500E and 500F the user input drags the selected design element 502 to create path portion 512D.

In GUI 500F, user input releasing or dropping the selecting design element 502 has been received (e.g. the end recording component of the animation definition input). This marks the end of the animation definition input. In this example, in response to detecting the end of the animation definition input application 104 has ceased displaying the bounding box around the selected design element 502 (thereby indicating the design element is no longer selected). In addition, application 104 has displayed a number of animation modification controls in the animation control area 504 (these will be discussed further below with reference to FIG. 6).

In GUIs 500C-500E the path is shown as being divided into 5 path portions (512A-512E). It will be appreciated, however, that this is for illustrative purposes only. In actual operation a continuous path is drawn and although recording that path may involve discretisation into discrete data points, such data points will be far more granular than path portions 512A-512E as depicted.

Further, in example GUIs 500C-500F, application 104 has actually displayed the path 512 that is created by the animation definition input on the canvas (the displayed path 512 being the animation path that will be recorded in the animation data). Displaying the path 512 provides the user with visual feedback as to the course of the path corresponding to their input during the operation. In alternative embodiments, however, application 104 need not display the path 512 that is created by the animation definition input.

Still further, in the present embodiments application 104 displays the selected design element 502 moving along the path that the user is creating with the animation definition input while that path is created. In other words, the user effectively draws or traces the path using the selected design element 502 itself. Moving the selected design element in accordance with the animation definition input (or, more specifically, in accordance with the draw component thereof) is advantageous as it provides the user with immediate feedback as to what the animation that is being created will look like when replayed.

Additionally, moving the selected design element in accordance with the animation definition input also allows the user to immediately tell whether the path that they are creating will result in the selected design element 502 disappearing or partially disappearing off the canvas 304 (and, therefore, the design page)—which a user may or may not wish to happen. To illustrate this, consider an application that permits a user to draw a path in order to create an animation but the path is drawn solely with the cursor 508 (or touch input) and the corresponding movement of the design element that is to be animated is not shown. In this case, the user input may move the cursor to a position near an edge of the canvas and although the cursor itself remains on the canvas the selected design element 502 will (if animated in accordance with the path crated by the user input) partially or wholly disappear of the canvas. To illustrate this, consider GUIs 500G and 500H. In GUI 500G, while recording an animation the user has created a path in which the cursor 508 moves close to the left and top edges of the canvas (i.e. of the design page). The user has not, however, moved the cursor 508 off the page. In GUI 500H, the animation recorded in FIG. 500G is being replayed. As can be seen, when the selected design element 502 is moved to the position of the cursor shown in GUI 500G the selected design element 502 has mostly disappeared off the design page. Creating an animation that causes a design element to disappear (partially or wholly) off the page may be intentional, however by not moving the selected design element in accordance with the animation definition input a user may not know if the path being created will or will not cause the selected design element to leave the page.

In alternative embodiments, application 104 need not be configured to display the selected design element 502 moving along the path that the user is creating with the animation definition input while they are creating that path (i.e. operation 406 can be omitted).

A further feature of the present embodiments can be seen in FIG. 5. In the present embodiments, application 104 generates animation data that defines (and displays) an animation path 512 that is based not on the position of the cursor 508 but instead on a centre (or centroid) of the selected design element 502 that the user is moving in order to create the path 512. This can be clearly seen, for example, in GUI 500F where the end of the path 512 does not coincide with the cursor 508, but instead coincides with the centre (or centroid) of the selected design element 502. In alternative embodiments, however, application 104 may instead generate animation data that defines a path that is based on the position of the cursor as it is moved to create the path.

Where application 104 bases the recorded path on the centre (or centroid) of the selected design element, the initial and final positions of the animation path are defined by the centre (or centroid) of the selected design element. Alternatively, where application 104 bases the recorded path on the position of the cursor (or touch input), the initial and final positions of the animation path are based on the positions of the cursor (or touch input) at the start and end of the path.

In certain implementations, application 104 may be configured to detect and act in accordance with one or more defined path modification inputs. Generally speaking, a path modification input can be invoked by a user so the path being created does not strictly follow the movement of the user's cursor control device or touch input.

By way of example, application 104 may be configured to provide a straight line path modifier. Where a keyboard is being used as an input device, the straight line path modifier may be invoked by a user holding down one or more defined straight line keys (e.g. the shift key or an alternative key/key combination). Where a touch screen is being used, the straight line path modifier may be invoked by a second touch input (separate to the touch input drawing the path). If application 104 detects the straight line modifier is active while the user is inputting the draw component of the animation definition input it restricts the path being drawn to a straight line even if the cursor control device or touch input is not a straight line. Application 104 may be configured to determine the angle of the straight line based on a calculated average angle of the user's input at that time. For example, if a user is tracing a path with an average angle of approximately 1 degree (while the straight line modifier is active), application 104 may record a horizontal line (at angle 0 degrees). As an alternative example, if a user is tracing a path with an average angle of approximately 85 degrees (while the straight line modifier is active), application 104 may record a vertical line (at angle 90 degrees).

At 408, application 104 generates animation data in accordance with the animation definition input (or, in particular, in accordance with the draw component of the animation definition input). In the present example, application 104 generates animation data while the animation definition input is being received. In alternative embodiments, however, application 104 may generate animation data at a later time based on user input data (e.g. cursor or contact movement data) that is recorded during the animation definition input.

In the present embodiments, the animation data that is generated by application 104 generally describes (and allows reproduction of) two aspects of an animation: an original path and original traversal speeds.

The original path described by the animation data allows the path 512 that is created by the animation definition input (or, specifically, by the draw component of the animation definition input) to be reproduced.

The original traversal speeds described by the animation data allow the original speeds of the draw component of the animation definition input to be reproduced: i.e. the speeds at which the draw component of the animation definition input is/are performed. For example, and referring to FIG. 5, in creating path 512 a user may: draw path component 512A and 512B very quickly, gradually slow down over path component 512C, and speed up again over path component 512D. The traversal speeds described by the animation data allows these different speeds to be reproduced when the animation is replayed.

For clarity, it is noted that traversal speeds and animation duration are distinct concepts. Animation duration refers to the amount of time an animation takes to play (from start to finish). In contrast, traversal speeds refer to the speeds at which the design element traverses the animation path. An animation may have an original duration of 5 seconds and over the course of that original 5 seconds the element may adopt a variety of traversal speeds (e.g. initially fast, then slow, then fast, then faster, then slow, then slower, etc.).

In the present embodiments, the animation data is generated by sampling the animation definition input (and, specifically, the draw component of that input) at a plurality of sample times over the course of the draw component. At each sample point, application 104 generates a data point.

In the present embodiments, the sample times are determined with reference to a defined sample rate. Application 104 may be configured to use any appropriate defined sampling rate, for example a rate of one sample per 10 ms.

In some cases application 104 may not actually be able to sample at the defined sampling rate—for example due to processing or data communication restrictions. In this case, application 104 is configured to sample as close to the defined sampling rate as possible and at each sample to record both a spatial position (e.g. the (x,y) coordinate pair defined by the user input) and a sample time (e.g. the number of milliseconds since the draw component started at which the sample was taken—or an alternative means of recording time).

In these embodiments, therefore, the original path and original traversal speeds described by the animation data are reproducible from a series of discrete data points. Given this discretisation, while reference will be made to reproducing the path and traversal speeds of the animation definition input it will be appreciated that this reproduction may not be 100% accurate to the user's actual movement of the cursor control device or touchscreen contact that causes the path to be created (in the draw component of the touch screen input).

In the present embodiments, application 104 is configured to generate animation data that includes a set (in particular an array) of animation data points (one corresponding to each sample of the user input that draws the animation path). Each animation data point includes time and position data. In particular, each data point defines an (x,y) coordinate set (defining a position on the design page) and a time value (defining a time during the animation at which the selected element appears at that position). For example, each data point may be a tuple taking a format of (time, x-coordinate, y-coordinate).

The x- and y-coordinates will typically be stored in the coordinate system of the design page. For example, in the above design data format a page width and height are defined. The coordinate system may be such that x-coordinates run horizontally, left to right, from 0 to the page width, and y-coordinates run vertically, top to bottom, from 0 to the page height. Alternative coordinate systems are possible.

To illustrate this animation data format consider the following array:

[(0,0,0), (10,5,5), (20,5,5), (30,10,10), (40,20,20), . . . ]

This defines an animation in which the design element that the animation data is associated with: is positioned at (0,0) at 0 milliseconds (the start of the animation); is positioned at (5,5) at is positioned at (5,5) at 20 ms; is positioned at (10,10) at 30 ms; is positioned at (20,20) at and so forth.

If the draw component of the animation definition input leaves the canvas 304 (and, therefore, the page defined by that canvas) various options are possible. In some instances, application 104 may record default coordinate values for any part of a path that is off-page (e.g. x=−1, y=−1). Alternatively, application 104 may be configured to continue tracking x/y coordinates within the page's coordinate system even when the path is off page. In this case, an x coordinate that is off page will be a value that is either negative or exceeds the page width, and a y coordinate that is off page will be a value that is either negative or exceeds the page height.

Alternative forms (and/or formats) of animation data are, however, possible.

For example, if a sampling rate is defined and application 104 can reliably sample the animation definition input at that sampling rate, animation data may include a set of (x-coordinate, y-coordinate) data points only. In this case, time data need not be stored. For example, if the sampling rate is known to be 10 ms, then the following animation data is equivalent to the above example in which time is explicitly stored (as each data point/array element is known to represent the position at 10 ms after the previous element of the array):

[(0,0), (5,5), (5,5), (10,10), (20,20), . . . ]

In certain implementations, recording and storing animation data without explicitly recording a time for each (x,y) position may be appropriate. In other cases, however—for example if the application 104 cannot guarantee consistent sampling at the defined sampling rate when recording the animation (as described further below)—explicitly recording the time for each (x,y) position may be advantageous.

It will be appreciated that while the term traversal speeds (plural) is used, the traversal speeds for a given path may be a single speed (e.g. if the user input traces a path with a single, constant speed). Furthermore, while the animation data allows traversal speeds to be reproduced this can be done without explicitly storing explicit speed (or velocity or acceleration) data. The example above illustrates this: while speeds (and/or velocities) can be calculated based on the time taken to move between adjacent data points, speeds are not explicitly stored.

Further alternative forms of animation data that allow for both the path itself and traversal speeds to be reproduced are possible. For example, animation data may make use of a starting position and velocity and/or acceleration data to allow the path and traversal speeds to be reproduced.

In the present implementation, once the animation definition input is complete, application 104 displays animation modification controls and may receive user input that applies one or more modifications to the animation. This is indicated at 410. In this example, these controls are displayed are in the animation control area 504 of the GUI.

Figure 6:
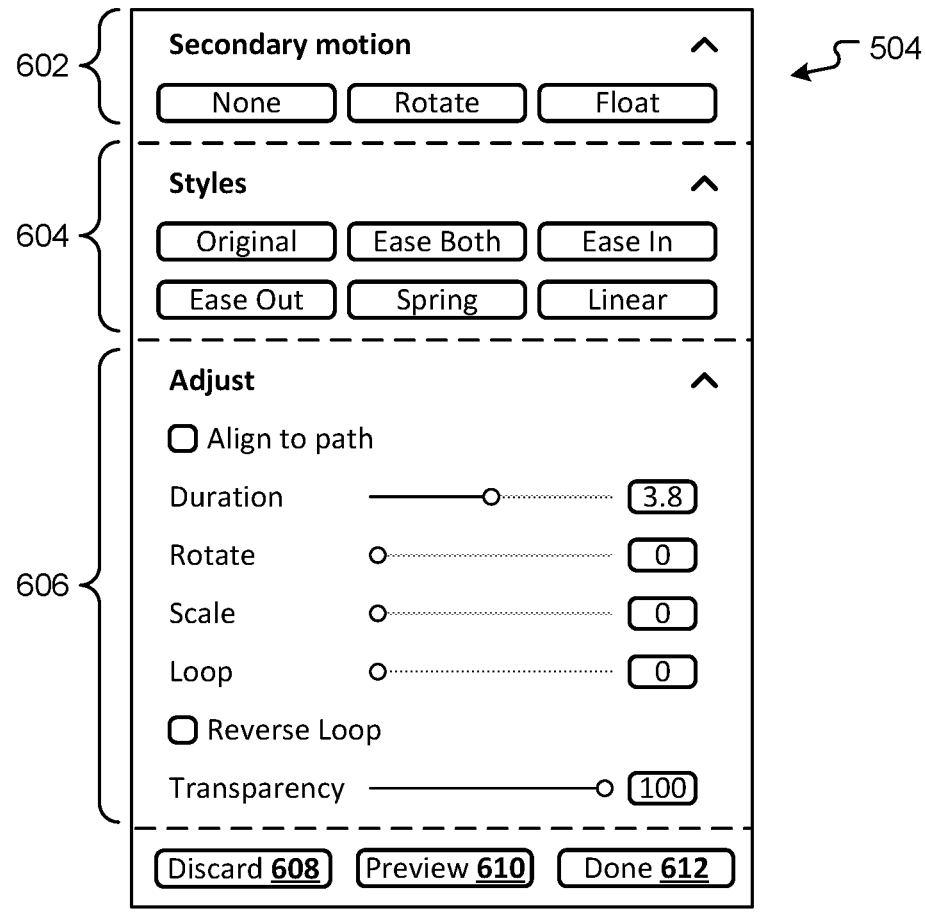
FIG. 6 depicts an example user interface with animation modification controls.

Various animation modification controls (and various layouts/presentation of those controls) are possible. FIG. 6 provides an example of animation modification controls.

In the example of FIG. 6, the animation modification controls include one or more secondary motion controls 602, one or more style controls 604, and one or more adjustment controls 606.

In the present example, the secondary motion controls 602 include: a "none" control which, if selected, removes any secondary motion that a user may have selected to apply to the animation; a "rotate" control which, if selected, causes application 104 to apply a rotation effect to the animation when it is replayed (e.g. so the selected design element rotates at a constant rotation speed as it traverses the animation path); and a "float" control which, if selected, causes application 104 to apply a "float" effect to the animation when it is replayed (e.g. so the selected design element repeatedly increases and decreases in size as it traverses the animation path in order to provide the visual effect of the element floating along the path).

In the present example, the style controls 604 include: an "original" control which, if selected, causes application 104 to remove any selected style; an "ease in" control which, if selected, causes application 104 to apply an easing effect to the start of the animation (e.g. so that when replayed the animation starts slowly and accelerates into the recorded traversal speeds); an "ease end" control which, if selected, causes application 104 to apply an easing effect to the end of the animation (e.g. so that when replayed the animation decelerates from the recorded traversal speeds at the end of the animation); an "ease both" control which, if selected, causes application 104 to apply both the "ease in" and "ease out" styles; a "spring" control which, if selected, causes application 104 to apply a spring effect (e.g. so that when replayed the animation causes the design element to bounce back and forward at one or both ends of the animation); and a "linear" control which, if selected, causes application 104 to linearise the speed of the application (i.e. so that the original traversal speeds is ignored when the animation is replayed and, instead, a constant traversal speeds is applied).

In the present example, the "ease in", "ease out", "ease both" and "linear" styles impact the traversal speeds of the animation when it is replayed. When one of the "ease in", "ease out", and "ease both" styles is selected, the traversal speeds at the start and/or end of the animation is adjusted on replay (though such adjustment may still maintain speeds that are based on the original traversal speeds): the middle portion of the animation, however, is replayed at replay speeds that are based on the original traversal speeds. If the "linear" style is selected, however, the traversal speeds recorded for the animation is ignored. In this case, application 104 replays the animation so that the element traverses the animation path in the defined animation duration (which may be the original duration or an adjusted duration as discussed below), but application 104 calculates a constant traversal speed so that (any easing aside) the element in question traverses the path within the duration at that constant speed without slowing up/speeding down.

Selection of a style control 604 may also cause application 104 to adjust the animation path as originally recorded. For example, when a style control is selected application 104 may be configured to apply a smoothing process to the originally drawn animation path. As one example, application 104 may process the originally drawn/recorded animation path to generate a smoother version thereof. As another example, in a style such as the "Spring" style described above application 104 may extend one or both ends of the originally drawn/recorded path which provides new path portions for the design element to 'spring' in.

In the present example, the adjustment controls 606 include: an "align to path" control, which is a binary control (on/off) and, if selected, causes application 104 to align the design element with the animation path when the animation is replayed (e.g. by causing the design element to rotate as it traverses the animation path in accordance with the angle of the path at a given point); a "duration" control, which is a slider control that can be used to set a duration for the animation, so that when the animation is replayed application 104 causes the entire animation to take the defined duration; a "rotation" control, which is a slider control that can be used to set a rotation value (e.g. element rotation=x, $0<=x<=360$ degrees), so that when the animation is replayed application 104 causes the selected design element to rotate from its original rotation (as defined by the element's rotation attribute) to the rotation selected by the animation rotation control as it traverses the animation path (i.e. so that the element rotates while it is traversing the path and reaches the rotation set by the animation rotation control when it reaches the end of the path); a "scale" control, which is a slider control that can be used to set a scale value (e.g. scale y, $0<y<=1$), so that when the animation is replayed application 104 causes the selected design element to change in scale from its original scale to the scale selected by the animation scale control as it traverses the animation path (i.e. so that the element gradually increases or decreases in size while it is traversing the path and reaches the scale set by the animation scale control when it reaches the end of the path); a "loop" control, which is a slider control that can be used to set a number of times the animation automatically replays; a "reverse loop" control, which is a binary control (on/off) and, if selected, causes application 104 to reverse the animation when it is replayed (so that the selected design element traverses the animation path in reverse); and a "transparency" control, which is a slider control that can be used to set a transparency value, so that when the animation is replayed application 104 causes the selected design element to change from its original transparency to the transparency selected by the animation transparency control as it traverses the animation path (i.e. so that the element gradually increases or decreases in transparency while it is traversing the path and reaches the transparency set by the animation transparency control when it reaches the end of the path).

In the present example, the "duration" control can be used to set the duration of the animation when it is replayed. In the present embodiments, application 104 provides a default duration value that is the original duration of the animation: i.e. the time taken by the draw component of the animation definition input (or, phrased alternatively, the time between the selection and end recording components of the animation definition input). If a user sets a different duration via the duration control, this changes the duration of the animation when it is replayed. In the present embodiments, however, even if the duration is changed (and unless the 'linear control discussed above has also been selected) application 104 still bases the replay speeds on the original traversal speeds when replaying the animation. More specifically, if an animation is replayed at its original duration, the replay speeds are equal to the original traversal speeds. If, however, an animation is replayed at a changed duration, the replay speeds are proportional to the original traversal speeds.

To illustrate, consider again the animation depicted in FIG. 5 and assume that the original traversal speeds were such that: path segment 512A was traversed in 3 seconds; path segment 512B was traversed in 4 seconds; path segment 512C was traversed in 2 seconds; and path segment 512D was traversed in 1 second. In this example, therefore, the original duration of the animation is 10 seconds. If a user set the duration to 5 seconds (half the original duration), application 104 would, when replaying the animation, display the element moving at traversal speeds proportional to the original traversal speeds, e.g. so that: path segment 512A is traversed in 1.5 seconds; path segment 512B is traversed in 2 seconds; path segment 512C is traversed in 1 seconds; and path segment 512D was traversed in 0.5 seconds—giving a total duration of 5 seconds. Conversely, if a user set the duration to 20 seconds (double the original duration), application 104 would, when replaying the animation, display the element moving at traversal speeds proportional to the original traversal speeds, e.g. so that: path segment 512A is traversed in 6 seconds; path segment 512B is traversed in 8 seconds; path segment 512C is traversed in 4 seconds; and path segment 512D was traversed in 2 seconds—giving a total duration of 20 seconds. It will be appreciated that this example is for illustrative purposes only, and that the sampling of the animation definition input would typically provide far more granular data than is indicated by path segments 512A-512D.

It will be appreciated that additional, fewer, or alternative animation modification controls may be provided. Further, in certain embodiments application 104 may be configured to automatically save the animation data once the animation definition input has been completed without providing any animation modification options.

In the present embodiments, once the animation definition input has been completed, application 104 additionally displays (also in the animation control area 504 in this example) a discard control 608, a preview control 610, and a done control 612. At 412 application 104 receives user input selecting one of these controls.

In response to user input selecting the discard control 608, processing proceeds to 414 and application 104 discards the animation (without saving it). In addition, application 104 may also cease displaying the animation control area 504. In place of the animation control area 504, application 104 may: return to displaying the notification 506 so a user can record/create a new animation (e.g. return to 404); display alternative user interface controls (e.g. by displaying asset preview area 310); or simply close the animation control area 504 (e.g. allowing the design preview area 302 to enlarge).

In response to user input selecting the preview control 610, processing proceeds to 416 and application 104 replays the animation (taking into account any modifications that have been selected via the secondary motion controls 602 and/or style controls 604). Animation replay is described further below (and, for clarity, user input selecting the preview control 610 may be considered a replay animation event). Processing may then return to 410.

In response to user input selecting the done control 610, processing proceeds to 418 where application 104 finalises and stores the animation. In the present embodiments, this involves performing an animation data reduction process (at 420) and then storing the animation data (at 422). In response to user input selecting the done control 612, application 104 may also cease displaying the animation control area 504. In place of the animation control area 504, application 104 may: return to displaying the notification 506 so a user can record/create a new animation (e.g. return to 404); display alternative user interface controls (e.g. by displaying asset preview area 310); or simply close the animation control area 504 (e.g. allowing the design preview area 302 to enlarge).

In the present embodiment, application 104 performs an animation data reduction process at 420 before storing the animation data. (This processing could be performed at any time after completion of the animation definition input received at 404, however if the animation is discarded such processing would be obsolete/unnecessary.) Generally speaking, this involves processing the animation data generated at 408 to generate (or, at least, to attempt to generate) reduced animation data.

In the present embodiments, and with reference to the example animation data format described above (which includes a set of position/time tuples), application 104 may perform various processing to reduce (or attempt to reduce) the animation data.

For example, application 104 may process the animation data to identify stationary (or approximately stationary) segments within it. This may involve comparing temporally adjacent data points in the animation data to calculate the spatial distance between those points. Temporal adjacency here refers to the time component of the data points being adjacent. If the spatial distance between two temporally adjacent data points is less than a defined distance threshold, the latter of the adjacent data points can be deleted.

To illustrate this, consider animation data as follows (with tuple format of (time, x, y) as described above).

[(0,0,0), (10,5,5), (20,5,5), (30,5,6), (40,5,15) . . . ]

For this animation data, application 104 would calculate the spatial distance between the $2^{nd}$ and $3^{rd}$ data points (10,5,5) and (20,5,5) is zero. Accordingly, Application 104 may delete the $3^{rd}$ data point, giving animation data of:

[(0,0,0), (10,5,5), (30,5,6), (40,5,15) . . . ]

Application 104 may then calculate the spatial distance between the new (following deletion of the original $3^{rd}$ data point) $2^{nd}$ and $3^{rd}$ data points ((10,5,5) and (30,5,6)). Application 104 calculates the spatial difference between the (x,y) coordinates of these data points (5,5) and (5,6) which (calculated on a simple geometric basis—e.g. Square root ((x2−x) 2+(y2−y1) 2) is 1 pixel. If 1 pixel is less than the distance threshold application 104 would then delete the (new) $3^{rd}$ data point, giving animation data of:

[(0,0,0), (10,5,5), (40,5,15) . . . ]

Conversely, if 1 pixel was greater than the distance threshold, application 100 would not delete the (new) $3^{rd}$ data point.

In some instances the distance threshold may be zero (in which case application 104 will only delete a data point if it defines the exact same (x,y) position as the temporally preceding data point. Where a zero distance threshold is to be implemented, application 104 may simply determine if temporally adjacent data points define the same position (i.e. have the same (x,y) coordinates) without actually calculating a distance between the data points. If the data points define the same position, then the latter data point is deleted.

In other implementations a non-zero distance threshold may be used. In these cases the threshold adopted may be based on the first input sampling rate. As an example, if the first input sampling rate is 10 ms a spatial distance threshold of 3 pixels may be appropriate (though alternative thresholds may be implemented).

By way of further example, application 104 may also (or alternatively) be configured to convert the originally recorded animation data (in this example a series of (time, x, y) tuples) to a vector graphic path and timing data. For example, application 104 may process the coordinates recorded for the originally drawn path to generate a vector graphic (such as a Scalable Vector Graphic, SVG) corresponding thereto: e.g. a string that defines a sequence of shapes (such as straight lines, cubic Bezier curves, and/or quadratic Bezier curves) that define a vector graphic path that corresponds (or substantially corresponds) to the originally drawn path. At the same time, application 104 calculates, based on the originally recorded data, an easing equation that returns the percentage of the total distance based on the percentage of the duration of the animation. Application 104 can then use the easing equation to generate timing data—for example a set of (time, distance) data pairs. Application 104 can then store the animation as (and replay the animation based on) the vector graphic and the timing data.

Reducing the animation data can be advantageous as in certain circumstances it will reduce the amount of data required to define the animation. This, in turn, reduces the memory required to store the animation and, in some cases, the processing required to replay the animation. In alternative embodiments, however, the animation data as originally generated may be stored without performing any data reduction/minimisation process.

At 422, application 104 stores the animation data. The animation data is stored so as to be associated with the design element that the animation relates to (e.g. the design element selected by the animation definition input). Furthermore, if any amination modifications are made, animation modification data that defines such modifications is also stored.

As noted, animation data may be stored in various ways. In the present example, and as noted below, the element record for an element that has an associated animation includes an animation object. Various animation object data formats (and attributes) are possible. By way of example, however, an animation object may be a dictionary (set of key-value pairs) allowing attributes such as the following to be stored:

| Key/field | Note | E.g. |
| --- | --- | --- |
| Animation | Data describing the animation path and traversal speeds (e.g. as described above). | "animation": [(...),(...), ... (...)], |
| Rotate | A Boolean/flag indicating whether the "rotate" secondary motion option has been selected. | "rotate": "T", |
| Float | A Boolean/flag indicating whether the "float" secondary motion option has been selected | "float": "T", |
| Alignment | A Boolean/flag indicating whether the "align to path" adjustment option has been selected. | "alignment": "F", |

| Key/field | Note | E.g. |
|---|---|---|
| Duration | A float recording the duration of the animation (either the original duration of the animation or a value manually set via the "duration" control). | "duration": 3.8, |
| Rotate | An integer recording a rotation value (either a default value - e.g. 0 - or a value manually set via the "rotate" control). | "rotation": 90, |
| Scale | A float recording a scale value (either a default value - e.g. 1 - or as manually set via the "scale" control). | "scale": 0.5, |
| Loop | An integer recording a number of loops (either a default value - e.g. 0 - or as manually set via the "loop" control). | "loop": 0, |
| Reverse | A Boolean/flag indicating whether the "reverse loop" adjustment option has been selected. | "reverse": "F", |
| Transparency | An integer recording a transparency value (either a default value - e.g. 0 - or a value manually set via the "transparency" control). | "transparency": 100, |
| Style | An Enum of style options. | "style": "Ease Both", |

If application 104 converts the animation to a vector graphic path and a set of timing data (as described above), these may also be stored in the animation object.

If design data is locally stored, application 104 stores the data by writing it to locally accessible memory of system 102. If design data is remotely stored, application 104 may cause the data to be stored by communicating the data to a relevant server application (which then stores the animation data on memory accessible to it—e.g. in a database or the like).

Figure 7:
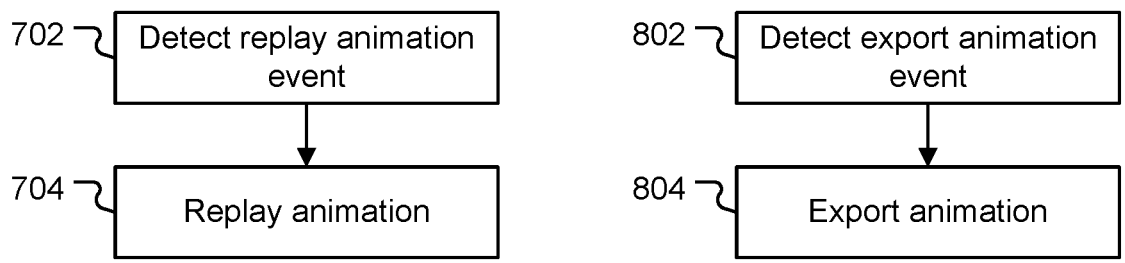
FIG. 7 depicts operations performed to replay an animation.

Once an element animation has been saved it can be replayed by a user that is viewing the design the element is part of. For example, and as depicted in FIG. 7, application 104 may detect a replay animation event (at 702) and, in response, replay the animation (at 704).

One example of a replay animation event is user activation of the preview control 610 described above.

As another example, once a user completes the animation definition input that initially creates the animation (i.e. following the end recording component of the animation definition input) application 104 may be configured to automatically replay the animation to provide the user with immediate feedback as to how the animation will look. In this case, completion of the animation definition input is a replay animation event.

In addition, or alternatively, when a design that includes an animation is displayed (for either the user that created the animation or another user who is viewing the design) application 104 may display one or more replay animation controls, activation of which is a replay animation event. For example, when a design that includes an animation is displayed application 104 may display a replay animation control as one of the additional controls 320. Additional/alternative replay controls may also be displayed, for example fast forward, rewind controls and/or a playhead that can be manually moved forward/backwards to control playback.

As a further example, in some instances application 104 may be configured to automatically play an animation, for example when a design that the animation is associated with is viewed. In this case, initial display of a design that is associated with an animation (or, more specifically, that includes an element that is associated with an animation) is a replay animation event.

In order to replay an animation (e.g. at 704), application 104 uses the stored animation data to display an animation in which: the original animation path is traversed by the element in question (unless the user has made modifications to the original path); and, unless the user has elected to linearise the animation, the original path is traversed at replay traversal speeds that are based on the original traversal speeds. If the duration of the animation has not been changed, the replay traversal speeds may (ignoring any easing) be the same as the original traversal speeds. If the duration of the animation has been changed, the replay traversal speeds will be proportional to the original traversal speeds as described above.

Figure 8:
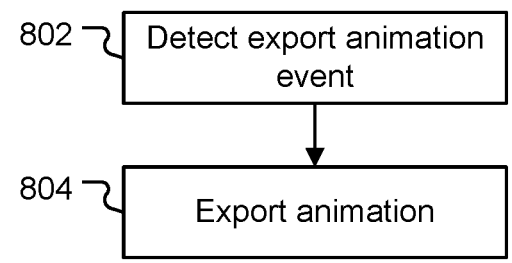
FIG. 8 depicts operations performed to export an animation.

Once an element animation has been saved application 104 can export that animation. For example, and as depicted in FIG. 8, application 104 may detect an export animation event (at 802) and, in response, export the animation (or the design or design page that includes the element that the animation is associated with) (at 804).

Various export animation events are possible. Example export design events include user activation of: a download design control; a publish design control; a share design control. Application 104 may, for example, be configured to display such controls in the additional controls area 320. Application 104 may also be configured to allow a user to export the design element that an animation relates to in isolation (e.g. against a white/transparent/other background), or to export the entire design page that that the animated element is part of (including any other design elements that have been added to that page, potentially with their own associated animations).

Where an element with an associated animation or a design page with such an element is exported to a format that supports video or animations (e.g. a MPEG4, MOV, AVI, GIF, or an alternative video format), application 104 exports the design to include the animation—i.e. so that the original animation path is traversed by the element in question (unless the user has made modifications to the original path) and, unless the user has elected to linearise the animation, the original path is traversed at replay traversal speeds that are based on the original traversal speeds. If the duration of the animation has not been changed, the replay traversal speeds may (ignoring any easing) be the same as the original traversal speeds. If the duration of the animation has been changed, the replay traversal speeds will be proportional to the original traversal speeds as described above.

With the example animation data described above (in which animation data points are defined by (t, x, y) tuples), replaying or otherwise rendering (e.g. for export) an animation associated with a design element generally involves sequentially displaying that design element at the (x,y) coordinate positions defined by the tuples. The time at which the design element is displayed at a particular (x,y) coordinate is determined by application 104 based on the time component of the tuple defining that coordinate. For example, to replay or render the following animation (that is associated with a particular design element):

[(0,0,0), (11,5,5), (20,5,8), (33,7,12), (40,20,20), . . . ]

Application 104 would display the particular design element at: position (0,0) at the start of the replay; position (5,5) at 11 ms; position (5,8) at 20 ms; position (7,12) at 33 ms; position (20,20) at and so forth. Movement between pairs of explicitly defined animation data points is assumed to be linear.

The examples provided above describe creating an animation for a single design element. The same processing may be performed to animate a group of design elements. For example, if two or more design elements have been grouped together, application 104 may be configured such that selection of an element that is a member of that group (at the selection component of the animation definition input) selects the entire group. In this case, when the draw component of the animation definition input is received application 104 shows the entire group moving—e.g. so the user effectively draws the path using the entire group of design elements. As noted above, when creating the path application 104 may be configured to base the path on either the cursor position itself or on a centre (or centroid) of the element that has been selected. This also applies where a group is selected, excepting that application 104 may be configured to base the path on the centroid of the group (rather than a single element thereof).

Further, while the examples described above describe animating a design element that is displayed on a canvas (which represents a page of a design), the techniques described can be adapted to animate a graphic element or object that is displayed in any manner on a display (i.e. whether on a "page" of a "design" or not).

The flowcharts illustrated in FIG. 4 and described above defines operations in a particular orders to illustrate various features of the present disclosure. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, while the operations are described as being performed by application 104 running on computer processing system 102, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method comprising:
    displaying, on a display, a design including a first design element;
    receiving, via the one or more user input devices, a first input that creates an original path between an initial position and a final position, wherein the first input draws the original path at original traversal speeds;
    generating, via at least one processing unit, original animation data based on the first input, the original animation data including data that allows both the original path and the original traversal speeds to be reproduced;
    processing, via at least one processing unit, the original animation data to generate reduced animation data, wherein the reduced animation data requires less memory to store than the original animation data and includes data that substantially allows the original path and the original traversal speeds to be reproduced; and
    associating, via at least one processing unit, the reduced animation data with the first design element.

2. The computer implemented method of claim 1, further comprising:
    detecting a first event; and
    in response to detecting the first event, using the reduced animation data to automatically display the first design element moving along a path that is based on the original path at replay speeds that are based on the original traversal speeds.

3. The computer implemented method of claim 1, further comprising:
    detecting a second event; and
    in response to detecting the second event, exporting the design to a video format by using the reduced animation data to render the first design element moving along a path that is based on the original path at replay speeds that are based on the original traversal speeds.

4. The computer implemented method of claim 2, wherein the replay speeds are the original traversal speeds.

5. The computer implemented method of claim 2, wherein the replay speeds are proportional to the original traversal speeds.

6. The computer implemented method of claim 1, wherein the first input includes user input that draws the original path using the first design element.

7. The computer implemented method of claim 1, wherein generating the original animation data includes recording a set of animation data points, each animation data point being associated with a spatial position and a time.

8. The computer implemented method of claim 7, wherein generating the original animation data includes sampling the first input at a plurality of sample times over the course of the first input and generating an animation data point corresponding to each sample point.

9. The computer implemented method of claim 7, wherein processing the original animation data to generate the reduced animation data includes:
    calculating a spatial distance between a pair of temporally adjacent animation data points in the animation data, the pair of temporally adjacent animation data points including a first data point associated with an earlier time and a second data point associated with a later time;
    determining whether the spatial distance is less than a distance threshold; and in response to determining that the spatial distance is less than the distance threshold, generating the reduced animation data by deleting the second data point from the animation data.

10. The computer implemented method of claim 1, wherein:
processing the original animation data to generate the reduced animation data includes processing the original animation data to generate a vector graphic corresponding to the original path; and
associating the reduced animation data with the first design element includes associating the vector graphic with the with the first design element.

11. The computer implemented method of claim 10, wherein:
processing the original animation data to generate the reduced animation data includes processing the original animation data to generate timing data, wherein the timing data is usable with the vector graphic to substantially allow the original path and the original traversal speeds to be reproduced; and
associating the reduced animation data with the first design element includes associating the timing data with the with the first design element.

12. A computer processing system comprising:
a processing unit;
a display;
one or more user input devices; and
a non-transitory computer-readable storage medium storing instructions, which when executed by the processing unit, cause the processing unit to perform a method comprising:
displaying, on the display, a design including a first design element;
receiving, via the one or more user input devices, first input that creates an original path between an initial position and a final position, wherein the first input draws the original path at original traversal speeds;
generating original animation data based on the first input, the original animation data including data that allows both the original path and the original traversal speeds to be reproduced;
processing the original animation data to generate reduced animation data, wherein the reduced animation data requires less memory to store than the original animation data and includes data that substantially allows the original path and the original traversal speeds to be reproduced; and
associating the reduced animation data with the first design element.

13. The computer processing system of claim 12, wherein the method further comprises:
detecting a first event; and
in response to detecting the first event, using the reduced animation data to automatically display the first design element moving along a path that is based on the original path at replay speeds that are based on the original traversal speeds.

14. The computer processing system of claim 12, wherein the first input includes user input that draws the original path using the first design element.

15. The computer processing system of claim 12, wherein generating the original animation data includes recording a set of animation data points, each animation data point being associated with a spatial position and a time.

16. The computer processing system of claim 15, wherein generating the original animation data includes sampling the first input at a plurality of sample times over the course of the first input and generating an animation data point corresponding to each sample point.

17. The computer processing system of claim 15, wherein processing the original animation data to generate the reduced animation data includes:
calculating a spatial distance between a pair of temporally adjacent animation data points in the animation data, the pair of temporally adjacent animation data points including a first data point associated with an earlier time and a second data point associated with a later time;
determining whether the spatial distance is less than a distance threshold; and
in response to determining that the spatial distance is less than the distance threshold, generating the reduced animation data by deleting the second data point from the animation data.

18. The computer processing system of claim 12, wherein:
processing the original animation data to generate the reduced animation data includes processing the original animation data to generate a vector graphic corresponding to the original path; and
associating the reduced animation data with the first design element includes associating the vector graphic with the with the first design element.

19. The computer processing system of claim 12, wherein:
processing the original animation data to generate the reduced animation data includes processing the original animation data to generate timing data, the timing data usable with the vector graphic to substantially allow the original path and the original traversal speeds to be reproduced; and
associating the reduced animation data with the first design element includes associating the timing data with the with the first design element.

20. A non-transitory storage medium storing instructions executable by processing unit to cause the processing unit to perform a method comprising:
displaying a design including a first design element;
receiving first input that creates an original path between an initial position and a final position, wherein the first input draws the original path at original traversal speeds;
generating original animation data based on the first input, the original animation data including data that allows both the original path and the original traversal speeds to be reproduced;
processing the original animation data to generate reduced animation data, the reduced animation data including data that substantially allows the original path and the original traversal speeds to be reproduced; and
associating the reduced animation data with the first design element.

* * * * *